United States Patent [19]

Cann et al.

[11] Patent Number: 5,342,907
[45] Date of Patent: * Aug. 30, 1994

[54] ETHYLENE/PROPYLENE COPOLYMER RUBBERS

[75] Inventors: Kevin J. Cann, Rocky Hill, N.J.; Fathi D. Hussein, Cross Lanes, W. Va.; Kiu H. Lee, So. Charleston, W. Va.; Daniel P. Zilker, Jr., Charleston, W. Va.; James W. Nicoletti; Xinlai Bai, both of Piscataway, N.J.

[73] Assignee: Union Carbide Chemicals & Plastics Technology Corporation, Danbury, Conn.

[*] Notice: The portion of the term of this patent subsequent to Jul. 26, 2011 has been disclaimed.

[21] Appl. No.: 83,616

[22] Filed: Jun. 28, 1993

[51] Int. Cl.$^5$ ............................................. C08F 4/68
[52] U.S. Cl. ..................................... 526/129; 526/153; 526/348; 526/281; 526/901; 502/108; 502/110
[58] Field of Search ............... 526/129, 153, 281, 348, 526/901

[56] References Cited

U.S. PATENT DOCUMENTS

| | | | |
|---|---|---|---|
| 3,674,766 | 7/1972 | Mottus et al. | 260/88.2 |
| 4,508,842 | 4/1985 | Beran et al. | 502/112 |
| 4,892,853 | 1/1990 | Cann et al. | 502/112 |
| 5,082,908 | 1/1992 | Imai et al. | 526/143 |
| 5,245,007 | 9/1993 | Yamanoto et al. | 528/483 |

FOREIGN PATENT DOCUMENTS

| | | |
|---|---|---|
| 0413530 | 2/1991 | European Pat. Off. . |
| 1519473 | 7/1978 | United Kingdom . |
| 2105355 | 3/1983 | United Kingdom . |

*Primary Examiner*—Joseph L. Schofer
*Assistant Examiner*—David Wu
*Attorney, Agent, or Firm*—Saul R. Bresch

[57] ABSTRACT

A process comprising contacting a mixture comprising ethylene, propylene, and, optionally, a diene, in the gas phase, under polymerization conditions, with a catalyst system comprising:

(a) a catalyst precursor, in independent or prepolymer form, consisting of vanadium (acetylacetonate)$_3$;

(b) optionally, a support for said precursor;

(c) a cocatalyst consisting essentially of (i) an alkylaluminum halide having the formula AlR$_{(3-a)}$X$_a$ wherein each R is independently alkyl having 1 to 14 carbon atoms; each X is independently chlorine, bromine, or iodine; and a is 1 or 2, and (ii) optionally, a trialkylaluminum provided that the molar ratio of alkylaluminum halide to trialkylaluminum is at least about 1.5:1; and (d) optionally, a promoter, which is a chlorinated ester having at least 2 chlorine atoms; a saturated or unsaturated aliphatic halocarbon having at least 3 carbon atoms and at least 6 halogen atoms; or a haloalkyl substituted aromatic hydrocarbon wherein the haloalkyl substituent has at least 3 halogen atoms.

13 Claims, No Drawings

ETHYLENE/PROPYLENE COPOLYMER RUBBERS

TECHNICAL FIELD

This invention relates to ethylene/propylene copolymer rubbers (EPRs), which include ethylene/propylene copolymers (EPDMs) and ethylene/propylene/ethylidene norbornene terpolymers (EPDMs), generally having a crystalline content of less than about 15 percent by weight, and a process for their production.

BACKGROUND INFORMATION

The EPRs are elastomeric copolymers and terpolymers used in such applications as hose and tubing, wire and cable, gaskets, and single ply roofing. They are usually formulated with fillers, oils, processing aids, and stabilizing agents, and cured by reacting the polymers with sulfur in the presence of accelerators or with a combination of sulfur and an organic peroxide such as dicumyl peroxide.

These polymers are presently manufactured commercially in solution and slurry processes with soluble vanadium catalysts. The processes are very expensive to run, requiring solvent removal and steam stripping steps. In addition, these solution catalysts do not provide satisfactory particle morphology in a fluidized bed. Improvement in these processes would be desirable and, particularly, the development of a gas phase process to produce these same products would be more economically attractive because little postreaction cost will be incurred.

One of the catalysts selected to produce the EPRs in the gas phase is described in U.S. Pat. No. 4,508,842. This catalyst is one of several conventional catalysts useful for the production of polyethylene, and it would be commercially advantageous to have a catalyst, which, not only can be utilized in the production of polyethylenes having good properties, but can also be used successfully for the production of EPR's.

Typically, the catalyst described in the above-mentioned United States patent, is comprised of a catalyst precursor, which is the reaction product of vanadium trichloride and an electron donor, the precursor being reacted with an aluminum containing modifier, and impregnated into a silica support; a promoter such as chloroform; and a triisobutylaluminum cocatalyst. This catalyst does achieve good particle morphology, but poor overall product, e.g., EPRs made with this catalyst exhibit poor cure and contain much high temperature crystallinity. This is believed to be the result of poorly distributed propylene, and, in the case of the EPDMs, poorly distributed diene. Adjustments with respect to the cocatalyst and the promoter were found to improve the propylene distribution and lower the high temperature crystallinity, but only a marginal improvement in the cure was achieved.

DISCLOSURE OF THE INVNETION

An object of this invention, therefore, is to provide a gas phase process with which the production of EPRs having a high cure performance can be achieved, and, yet, one which can also be used successfully to produce polyethylene. Other objects and advantages will become apparent hereinafter.

According to the present invention, the above object is met by the discovery of a process for the production of EPRs comprising contacting a mixture comprising ethylene, propylene, and, optionally, a diene, in the gas phase, under polymerization conditions, with a catalyst system comprising:

(a) a catalyst precursor, in independent or prepolymer form, consisting of vanadium (acetylacetonate)$_3$;

(b) optionally, a support for said precursor;

(c) a cocatalyst consisting essentially of (i) an alkylaluminum halide having the formula $AlR_{(3-a)}X_a$ wherein each R is independently alkyl having 1 to 14 carbon atoms; each X is independently chlorine, bromine, or iodine; and a is 1 or 2, and (ii) optionally, a trialkylaluminum provided that the molar ratio of alkylaluminum halide to trialkylaluminum is at least about 1.5:1; and (d) optionally, a promoter, which is a chlorinated ester having at least 2 chlorine atoms; a saturated or unsaturated aliphatic halocarbon having at least 3 carbon atoms and at least 6 halogen atoms; or a haloalkyl substituted aromatic hydrocarbon wherein the haloalkyl substituent has at least 3 halogen atoms.

DESCRIPTION OF THE PREFERRED EMBODIMENT(s)

The catalyst precursor is vanadium (acetylacetonate)$_3$, a known compound having one vanadium cation and three enolate anions prepared by conventional processes. It can also be referred to as vanadium triacetylacetonate.

As noted above, a support is optional. If used, the support can be silica, alumina, or polymeric; however, silica is preferred. Examples of polymeric supports are porous crosslinked polystyrene and polypropylene. A typical silica or alumina support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of vanadium per gram of support and preferably about 0.4 to about 0.9 millimole of vanadium per gram of support. Impregnation of the above mentioned catalyst precursor into a silica support can be accomplished by mixing the precursor and silica gel in an inert solvent followed by solvent removal under reduced pressure.

Spray-drying technology can be used to generate well shaped catalyst precursors having little or no silica or other inorganic solids content.

The cocatalyst consists essentially of an alkylaluminum halide having the formula $AlR_{(3-a)}X_{(a)}$ wherein each R is independently alkyl having 1 to 14 carbon atoms; each X is independently chlorine, bromine, or iodine; and a is 1 or 2, and, optionally, a trialkylaluminum compound. Alkylaluminum halides falling within the above formula include alkylaluminum mono- and dichlorides wherein each alkyl radical has 1 to 6 carbon atoms. Examples of the alkylaluminum halides are diethylaluminum chloride; ethylaluminum dichloride; ethylaluminum sesquichloride; di-n-butylaluminum chloride; diisobutylaluminum chloride; methylaluminum sesquichloride; isobutylaluminum sesquichloride; dimethylaluminum chloride; di-n-propylaluminum chloride; methylaluminum dichloride; and isobutylaluminum dichloride.

Examples of the trialkylaluminum compounds, which can have the formula AlR$_3$ wherein R is the same as above are as follows: triisobutylaluminum, trihexylaluminum, di-isobutylhexylaluminum, isobutyl dihexyl-aluminum, trimethylaluminum, triethylaluminum, tripropylaluminum, triisopropylaluminum, tri-n-butylaluminum, trioctylaluminum, tridecylaluminum, and tridodecylaluminum. The molar ratio of alkylaluminum halide to trialkylaluminum compound, if present, is at least about 1.5 : 1, and is preferably in the range of about 2 : 1 to about 3 : 1.

The cocatalyst can be present in the catalyst system in an amount of about 10 to about 500 moles of cocatalyst per gram atom of vanadium, and is preferably introduced in an amount of about 50 to about 150 moles of cocatalyst per gram atom of vanadium. In a fluidized bed process, the cocatalyst can be introduced in an amount of about 1000 to about 10,000 parts per million parts (ppm) by weight of resin present in the fluidized bed (note: resin includes initial resin used to provide the fluidized bed; resin produced; and fluidization aid, if any), and preferably in an amount of about 1500 to about 1500 parts per million parts of resin. About 0.01 to about 10 moles, and preferably about 0.1 to about 2 moles, of promoter can be used per mole of cocatalyst. In the fluidized bed process, the promoter can be introduced in an amount of about 500 to about 2500 parts per million parts (ppm) by weight of resin present in the fluidized bed plus, and preferably in an amount of about 800 to about 1400 parts per million parts of resin.

The optional promoter can be a chlorinated ester having at least 2 chlorine atoms or a perchlorinated ester. It can be impregnated into the support, if desired. Suitable esters are Cl$_3$CCOOC$_2$H$_5$ (ethyl trichloroacetate); Cl$_3$CCOOCH$_3$ (methyl trichloroacetate); CCl$_3$CCl=CClCOOC$_4$H$_9$; C$_6$H$_5$CCl$_2$COOR wherein R is an alkyal radical having 1 to 8 carbon atoms; and Cl$_2$C=CCl—CCl$_2$COOC$_4$H$_9$. The promoter can also be a saturated aliphatic halocarbon having the formula C$_3$(X)$_a$(F)$_b$(H)$_c$ wherein each X is independently chlorine, bromine, or iodine; a is an integer from 6 to 8; b and c are integers from 0 to 2; and a+b+c equal 8. Examples of these halocarbon promoters are hexachloropropane, heptachloropropane, and octachloropropane. These saturated halocarbon promoters are mentioned in U.S. Pat. No. 4,892,853. In addition, the promoter can also be an unsaturated aliphatic halocarbon such as perchloropropene or any unsaturated halocarbon having a CX$_3$ group attached to a C=C group wherein each X is independently chlorine, bromine, or iodine, or a haloalkyl substituted aromatic hydrocarbon wherein the haloalkyl substituent has at least 3 halogen atoms such as trichlorotoluene, and trichloroxylene. Again, the halogen can be chlorine, bromine, or iodine. The number of carbon atoms in the halocarbon or the haloalkyl substituent can be 1 to 14, and the number of benzene rings in the halocarbon or the aromatic hydrocarbon can be 1 to 3, but is preferably one.

As noted, the catalyst precursor can be impregnated into a support, if desired. In any case, the catalyst precursor, with or without the support, is dried. It can be introduced into the polymerization reactor in the supported form; as a liquid feed dissolved in a solvent; or in spray-dried form. The precursor is usually added prior to the introduction of the comonomers in a batch process, and continuously in a continuous process. The cocatalyst and promoter are preferably added separately neat or as solutions in an inert solvent, such as isopentane, to the polymerization reactor at the same time as the flow of ethylene is initiated.

The EPR polymerization is carried out in the gas phase, preferably in a fluidized bed made up of particulate EPM or EPDM. The fluidized bed can be a stirred fluidized bed reactor or a fluidized bed reactor, which is not stirred. In terms of the fluidized bed, a superficial velocity of about 1 to about 4.5 feet per second and preferably about 1.5 to about 3.5 feet per second can be used. The total reactor pressure can be in the range of about 150 to about 600 psia and is preferably in the range of about 250 to about 500 psia. The ethylene partial pressure can be in the range of about 25 psi to about 350 psi and is preferably in the range of about 80 psi to about 250 psi. The gaseous feed streams of ethylene, propylene, and hydrogen (or other chain transfer agent) are preferably fed to the reactor recycle line while liquid ethylidene norbornene or another diene, if used, is preferably fed directly to the fluidized bed reactor to enhance mixing and dispersion. The composition of the EPM or EPDM product can be varied by changing the propylene/ethylene molar ratio in the gas phase and the diene concentration in the fluidized bed. The product is intermittently discharged from the reactor as the bed level builds up with polymerization. The production rate is controlled by adjusting the catalyst feed rate.

The propylene/ethylene molar ratio is adjusted to control the level of propylene incorporated into the copolymer or terpolymer. For the vanadium catalyst described above, a range of about 0.35:1 to about 3:1 is preferred. The hydrogen/ethylene molar ratio is adjusted to control average molecular weights. For the same catalyst system, a range of about 0.001:1 to about 0.3:1 is preferred. The level of diene in the bed, if used, is in the range of about 1 to about 15 weight percent based on the weight of the bed, and is preferably in the range of about 2 to about 10 weight percent. Examples of useful dienes, in addition to ethylidene norbornene (ENB), are 1,4-hexadiene and dicyclopentadiene dimer.

The catalyst precursor described above can be used in prepolymer form. A technique for prepolymerization can be found in U.S. Pat. No. 4,970,279. Typically, the prepolymerization is carried out in the liquid phase in a similar manner to a diluent slurry polymerization. The catalyst system used in the prepolymerization is the same one that will be used in the gas phase polymerization. The difference lies in the monomers used and weight ratio of monomer(s) to catalyst precursor, which is at least about 10:1, and is typically about 50:1 to about 300:1. It should be pointed out that the numbers vary with the particular catalyst system selected. The prepolymer does not have to be the same as the resin product of the main polymerization.

The amount of prepolymer formed, in terms of grams of prepolymer per gram of catalyst precursor, generally depends on the composition of the prepolymer, the composition of the polymer being produced, and the productivity of the catalyst employed. The prepolymer loading is chosen so as to minimize prepolymer residue in the product resin. When using ethylene/propylene coprepolymers, prepolymer loading can be in the range of about 10 to about 500 grams of prepolymer per gram of catalyst precursor and is preferably in the range of about 50 to about 300 grams of prepolymer per gram of catalyst precursor.

A typical prepolymerization can be carried out in a slurry prepolymerizer. The equipment includes a monomer feed system, a reaction vessel, and an inert screener. The reactor is a jacketed pressure vessel with a helical ribbon agitator to give good solids mixing, and with a bottom cone to facilitate solids discharge. Ethylene is fed from cylinders, with the pressure regulated, through 4A or 13X molecular sieves to remove impurities, and then through a flow meter to measure flow rate. Other olefins, if required, are fed from cylinders via a dip tube with nitrogen pressure supplied to the cylinder headspace. They also pass through 4A or 13X molecular sieves and through a flow meter. The monomers can be fed to either the reactor headspace or subsurface, with subsurface preferred as it increases the reaction rate by eliminating one mass transfer step. Temperature is controlled with a closed loop tempered water system. Pressure is controlled with a vent/make-up system.

The finished prepolymerized catalyst is screened to remove skins, agglomerates, and other types of oversize particles that could cause feeding difficulties into the gas phase reactor. The screening is done with a vibratory screener with a 20 mesh screen. The screener is kept under a nitrogen atmosphere to maintain the prepolymerized catalyst activity. Oversize material is collected for disposition. The desired undersize fraction is discharged into a cylinder for storage and shipping.

The typical prepolymerization is a slurry polymerization of ethylene and one or more comonomers under mild conditions. Isopentane, hexane, and heptane can be used as the solvent, with isopentane preferred for its higher volatility. Mild conditions are necessary to minimize catalyst decay during the prepolymerization so that there is sufficient activity for the subsequent gas phase polymerization, which may occur months after the prepolymerization. Such conditions will vary with different catalyst systems, but are typically temperatures of about 25° to about 70° C., monomer partial pressures of about 15 to about 40 psi, and levels of cocatalyst and catalyst promoter of about 1 to about 5 moles per mole of vanadium. The prepolymer loading ranges from about 10 to about 500 grams of prepolymer per gram of supported catalyst precursor, preferably from about 50 to about 300 grams per gram. The comonomer content of the prepolymer can range from about 1 to about 40 weight percent. Hydrogen, or other chain transfer agents, can be added at the start of polymerization or throughout the polymerization to control molecular weight. When the polymerization is complete, the agitator is stopped and the solids are allowed to settle so that the excess solvent can be removed by decanting. The remaining solvent is removed by drying, using low temperatures to avoid catalyst decay. The dried prepolymer catalyst is discharged to a storage cylinder through an inert screener, to remove oversize (+20 mesh) material.

Steps can be taken to reduce agglomeration in the gas phase polymerization. For example, fluidization aids can be provided as described in U.S. Pat. No. 4,994,534. Also, the product discharge line between the reactor and the product pot is often plugged up with chunks between intervals of product drops. A continuous purge flow of nitrogen in the line prevents the plugging problem. Also, coating the reactor surface with a low surface energy material is shown to be beneficial to slow down the rate of fouling build up. In addition, control of the electrostatic level in the bed prevents static induced particle agglomeration. Static can be adjusted to a satisfactory level by controlled use of reaction rate, quick change of gas composition, selective use of static-neutralizing chemicals, and surface passivation with aluminum alkyls.

Static can also be controlled by using small amounts of an inert conductive particulate material such as carbon black. The amount of inert particulate material is that which is sufficient to control static, i.e., about 0.5 to about 1.5 percent by weight based on the weight of the fluidized bed. Carbon black is the preferred antistatic material. The mean particle size of the inert conductive particulate material is in the range of about 0.01 to about 150 microns, preferably to about 10 microns. The mean particle size can refer to the particle per se or to an aggregate as in the case of carbon black. The carbon black materials employed can have a primary particle size of about 10 to about 100 nanometers and an average size of aggregate (primary structure) of about 0.1 to about 10 microns. The surface area of the carbon black can be about 30 to about 1500 square meters per gram and can display a dibutylphthalate (DBP) absorption of about 80 to about 350 cubic centimeters per 100 grams. It is preferred to treat the particulate material prior to its introduction into the reactor to remove traces of moisture and oxygen. This can be accomplished by purging the material with nitrogen gas, and heating using conventional procedures. Other antistatic agents are also found to be effective in keeping the static level under control as mentioned, for example, in U.S. Pat. No. 5,194,526.

The residence time of the mixture of comonomers, product resin, and catalyst system, in the fluidized bed can be in the range of about 1.5 to about 8 hours and is preferably in the range of about 2 to about 4 hours, as mentioned above, the molecular weight can be controlled with hydrogen or other chain transfer agents. The final EPM or EPDM product can contain the following amounts of reacted comonomers: about 35 to about 80 percent by weight ethylene; about 18 to about 50 percent by weight propylene; and about 0 to about 15 percent by weight diene. The crystallinity, also in weight percent based on the total weight of the EPM or EPDM, can be in the range of zero (essentially amorphous) to about 15 percent by weight (nearly amorphous). The Mooney viscosity can be in the range of about 10 to about 150 and is preferably about 30 to about 100. The Mooney viscosity is measured by introducing the EPM or EPDM into a vessel with a large rotor, preheating for one minute at 100° C., and then stirring for four minutes at the same temperature. The viscosity is measured at 100° C. in the usual manner.

The fluidized bed reactor can be the one described in U.S. Pat. No. 4,482,687 or another conventional reactor for the gas phase production of, for example, polyethylene. The bed is usually made up of the same granular resin that is to be produced in the reactor. Thus, during the course of the polymerization, the bed comprises formed polymer particles, growing polymer particles, and catalyst particles fluidized by polymerizable and modifying gaseous components introduced at a flow rate or velocity sufficient to cause the particles to separate and act as a fluid. The fluidizing gas is made up of the initial feed, make-up feed, and cycle (recycle) gas, i.e., monomer and, if desired, modifiers and/or an inert carrier gas. A typical cycle gas is comprised of ethylene, nitrogen, hydrogen, and propylene, either alone or in combination. The process can be carried out in a batch or continuous mode, the latter being preferred. The essential parts of the first reactor are the vessel, the bed, the gas distribution plate, inlet and outlet piping, a compressor, a cycle gas cooler, and a product discharge system. In the vessel, above the bed, there is a velocity reduction zone, and in the bed, a reaction zone. Both are above the gas distribution plate.

Variations in the reactor can be introduced if desired. One involves the relocation of the cycle gas compressor from upstream to downstream of the cooler and another involves the addition of a vent line from the top of the product discharge vessel (stirred product tank) back to the top of the reactor to improve the fill level of the product discharge vessel.

The advantages of the invention are found in improved cure performance; improvement in high temperature crystallinity; the provision of a catalyst system, which is equal to or better than commercially available catalyst systems for the production of both EPM and EPDM and polyethylenes of varying densities and monomer content; and good particle morphology.

As noted, the process of this invention can also be used to produce polyethylenes. These polyethylenes are homogeneous, characterized by narrow molecular weight distributions and narrow comonomer distributions. A typical process in which the catalyst system described above can be used can be found in U.S. Pat. No. 4,508,842, which is mentioned above. The catalyst precursor can be used in prepolymer form in polyethylene production just as in EPR production. The preferred temperature for the production of homogeneous polyethylenes is in the range of about 65° C. to about 85° C. The polyethylenes are, generally, copolymers of ethylene and one or more alpha-olefins having 3 to 12 carbon atoms, and preferably 3 to 8 carbon atoms. Examples of the alpha-olefins are propylene, 1-butene, 1-hexene, 4-methyl-1-pentene, and 1-octene. Typical comonomer molar ratios are as follows: the propylene-/ethylene ratio can be in the range of about 0.05:1 to about 2.5:1 and is preferably in the range of about 0.25:1 to about 1.5:1. The 1-hexene/ethylene molar ratio can be in the range of about 0.005:1 to about 0.050:1 and is preferably in the range of about 0.008:1 to about 0.012:1. One more advantage is that the process described above with respect to both EPRs and homogeneous polyethylene can be generally effected with any vanadium precursor wherein vanadium is in the oxidation state of plus three or greater, although these are not preferred embodiments. Vanadium compounds which can be used to provide these precursors can be found, for example, in U.S. Pat. No. 4,918,038, and other patents mentioned above.

The patents mentioned in this application are incorporated by reference herein.

The invention is illustrated by the following examples.

EXAMPLES 1 to 8

The catalyst system used in the examples includes vanadium (acetylacetonate)3 as catalyst precursor; a cocatalyst, and a promoter. The vanadium (acetylacetonate)3 is impregnated into silica gel in a hexane solvent to provide 0.5 millimole of vanadium per gram of support, and the supported catalyst precursor is dried. A fluidized bed reactor similar to the one described above is also used in these examples.

POLYMERIZATION

EXAMPLES 1 to 6

The initial C3/C2 molar ratio is 1.2 and the initial H2/C2 molar ratio is 0.125. Ethylidene norbornene(ENB) is fed into the reactor in sufficient amount to provide the amount of ENB set forth for the product in Table I. The initial reaction temperature is 30° C. at an ethylene partial pressure of 90 psia and a total reactor pressure of 300 psig. Carbon black is used as a fluidization aid. A 10 percent by weight solution of DEAC in isopentane is fed to the reactor as a cocatalyst and a 10 percent by weight solution of ETCA in isopentane is fed to the reactor as a promoter. After approximately 24 hours at these conditions, the H2/C2 molar ratio is increased to 0.20 and subsequently to 0.25.

Catalyst productivity is determined by mass balance, and the polymer composition is determined by NMR (nuclear magnetic resonance) analysis. Polymerization process variables and various properties of the resin are set forth in Table I.

TABLE I

| Example | vanadium (percent by wt) | DEAC/V mol ratio | ETCA/V mol ratio | DEAC/ETCA mol ratio | temperature (°C.) | residence time (hrs) | DEAC (ppm) | ETCA (ppm) | Cat Prod (g/mmolV) |
|---|---|---|---|---|---|---|---|---|---|
| 1 | 2.5 | 68.42 | 14.38 | 4.54 | 35.17 | 5.02 | 4723 | 1661 | 1746.91 |
| 2 | 2.5 | 91.42 | 21.91 | 4.49 | 36.25 | 5.63 | 5567 | 1998 | 1873.48 |
| 3 | 2.5 | 90.95 | 17.80 | 4.95 | 34.23 | 5.91 | 5355 | 1763 | 1884.57 |
| 4 | 2.5 | 86.88 | 16.66 | 4.84 | 36.00 | 6.63 | 6019 | 2014 | 1982.87 |
| 5 | 2.5 | 76.16 | 16.47 | 4.51 | 38.98 | 7.79 | 6912 | 2409 | 1305.82 |
| 6 | 2.5 | 61.42 | 11.20 | 5.43 | 36.42 | 8.23 | 9475 | 2729 | 1213.15 |

| Example | Crystallinity (wt %) | MOONEY (EST ODR) | Cure: M(H) minus M(L) | C3 (wt %) | ENB (wt %) | Mw/Mn |
|---|---|---|---|---|---|---|
| 1 | 13.83 | 14.82 | — | 26.00 | 5.00 | — |
| 2 | 12.69 | 11.04 | 34.70 | 22.80 | 4.80 | 4.40 |
| 3 | 11.99 | 13.80 | — | 27.20 | 4.13 | — |
| 4 | 11.97 | 7.00 | 33.50 | 25.50 | 5.00 | 4.34 |
| 5 | 10.70 | 9.80 | — | 25.96 | 6.98 | — |
| 6 | 9.23 | 13.89 | — | 26.20 | 5.68 | — |

EXAMPLES 7 AND 8

The initial C3/C2 molar ratio is 3.0 and the initial H2/C2 molar ratio is 0.02. Ethylidene norbornene(ENB) is fed into the reactor in sufficient amount to provide ENB in the product of 3.5 and 3.0 percent by weight, respectively. The initial reaction temperature is 35° C. at an ethylene partial pressure of 60 and 70 psi, respectively, and a total reactor pressure of 300 and 350 psig, respectively. Carbon black is used as a fluidization aid. A 10 percent by weight solution of DEAC/TEAL (molar ratio of 2:1) in isopentane is fed to the reactor as a cocatalyst and a 10 percent by weight solution of ETCA in isopentane is fed to the reactor as a promoter.

Catalyst productivity is determined by mass balance, and the polymer composition is determined by NMR (nuclear magnetic resonance) analysis. Polymerization process variables and various properties of the resin are set forth in Table II.

TABLE II

| Example | vanadium (percent by weight) | DEAC + TEAL/V mole ratio | ETCA/V mol ratio | DEAC + TEAL/ETCA mol ratio | temperature (°C.) | residence time (hrs) | TEAL (ppm) |
|---------|------------------------------|--------------------------|------------------|----------------------------|-------------------|----------------------|------------|
| 7 | 2.5 | 125.8 | 19.5 | 4.30 | 35.02 | 5.59 | 2113 |
| 8 | 2.5 | 159.1 | 26.4 | 4.02 | 39.90 | 5.10 | 2057 |

| Example | DEAC (ppm) | ETCA (ppm) | Cat Prod (g/mmolV) | crystallinity (wt %) | MOONEY (EST ODR) | Cure: M(H) minus M(L) |
|---------|------------|------------|--------------------|-----------------------|------------------|-----------------------|
| 7 | 4460 | 1654 | 2266 | 7.1 | 15.3 | 20 |
| 8 | 4343 | 1722 | 2945 | 4.6 | 18.68 | — |

Notes to Examples and Tables:
1. DEAC = diethylaluminum chloride
TEAL = triethylaluminum
ETCA = ethyl trichloroacetate
C2 = ethylene
C3 = propylene
ENB = ethylidene norbornene
mmol = millimole
EPDM = ethylene/propylene/ethylidene norbornene terpolymer rubber.
2. vanadium (percent by wt) = the percent by weight of vanadium based on the weight of the supported catalyst precursor.
3. Cat Prod(g/mmolV) = the amount of EPDM produced plus fluidization aid in grams per millimole of vanadium.
4. Flow Index(g/10 min) = flow index is determined under ASTM-1238, Condition F, at 190° C. and 21.6 kilograms.
5. MOONEY (EST ODR) = Mooney viscosity is estimated using a oscillating disk rheometer (ODR). It is estimated from a linear correlation of gum Mooney viscosity under standard conditions [M(L)(minimum torque resistance) 1 + 4 at 125° C.] with M(L) measured in ASTM D-3568 formula no. 1 using an ODR at 160° C. and a 1° arc at 100 cpm.
6. Cure: M(H) minus M(L) = Formula no. 1 of ASTM D-3568 is used following Procedure 6.1.2 for a miniature internal mixer and Practice D-3182. A Brabender ™ mixer with a mixing head maintained at 90° C. is used. Vulcanization characteristics are measured following ASTM D-2084 test methods for the ODR. The cure meter test cavity is maintained at 160° C. The disk is oscillated through a 1° arc rotational amplitude at 100 cpm. The force required to rotate the disk to maximum amplitude is continuously measured. The difference between the maximum torque resistance, M(H), and M(L) is recorded.

We claim:

1. A process comprising contacting a mixture comprising ethylene, propylene, and, optionally, a diene, in the gas phase, under polymerization conditions, with a catalyst system comprising:
(a) a catalyst precursor, in independent or prepolymer form, consisting of vanadium (acetylacetonate)$_3$;
(b) optionally, a support for said precursor;
(c) a cocatalyst consisting essentially of (i) an alkylaluminum halide having the formula AlR$_{(3-a)}$X$_a$ wherein each R is independently alkyl having 1 to 14 carbon atoms; each X is independently chlorine, bromine, or iodine; and a is 1 or 2, and (ii) optionally, a trialkylaluminum provided that the molar ratio of alkylaluminum halide to trialkylaluminum is at least about 1.5:1; and
(d) a promoter, which is a chlorinated ester having at least 2 chlorine atoms; a saturated or unsaturated aliphatic halocarbon having at least 3 carbon atoms and at least 6 halogen atoms; or a haloalkyl substituted aromatic hydrocarbon wherein the haloalkyl substituent has at least 3 halogen atoms.

2. The process defined in claim 1 carried out in a fluidized bed.

3. The process defined in claim 1 wherein the cocatalyst is an alkylaluminum halide.

4. The process defined in claim 3 wherein the alkylaluminum halide is diethylaluminum chloride.

5. The process defined in claim 1 wherein the cocatalyst is a mixture of an alkylaluminum halide and a trialkylaluminum.

6. The process defined in claim 5 wherein the molar ratio of alkylaluminum halide to trialkylaluminum is about 2:1 to about 3:1.

7. The process defined in claim 6 wherein the alkylaluminum halide is diethylaluminum chloride and the trialkylaluminum is triethylaluminum.

8. The process defined in claim 1 wherein the promoter is ethyl trichloroacetate.

9. The process defined in claim 1 wherein the molar ratio of cocatalyst to vanadium is in the range of about 10:1 to about 500:1 and the optional support is silica.

10. A process comprising contacting ethylene, propylene, and, optionally, a diene, in the gas phase, in a fluidized bed, under polymerization conditions, with a catalyst system comprising:
(a) a catalyst precursor, in independent or prepolymer form, consisting of vanadium (acetylacetonate)$_3$;
(b) a silica support for said precursor;
(c) a cocatalyst consisting of diethylaluminum chloride; and
(d) a promoter consisting of ethyl trichloroacetate wherein the amount of cocatalyst introduced into the process is about 1000 to about 10,000 parts per million parts by weight of polymer in the fluidized bed.

11. The process defined in claim 10 wherein the amount of cocatalyst introduced into the process is about 1500 to about 5000 parts per million parts of polymer in the fluidized bed and the amount of promoter introduced into the process is about 800 to about 1400 parts per million parts of polymer in the fluidized bed.

12. A process for the production of homogeneous polyethylene comprising contacting a mixture comprising ethylene and one or more other alpha-olefins, in the gas phase, under polymerization conditions, with a catalyst system comprising:
(a) a catalyst precursor, in independent or prepolymer form, consisting of vanadium (acetylacetonate)$_3$;
(b) optionally, a support for said precursor;
(c) a cocatalyst consisting essentially of (i) an alkylaluminum halide having the formula AlR$_{(3-a)}$X$_a$ wherein each R is independently alkyl having 1 to 14 carbon atoms; each X is independently chlorine, bromine, or iodine; and a is 1 or 2, and (ii) optionally, a trialkylaluminum provided that the molar ratio of alkylaluminum halide to trialkylaluminum is at least about 1.5:1; and (d) a promoter, which is a chlorinated ester having at least 2 chlorine atoms; a saturated or unsaturated aliphatic halocarbon having at least 3 carbon atoms and at least 6 halogen atoms; or a haloalkyl substituted aromatic hydrocarbon wherein the haloalkyl substituent has at least 3 halogen atoms.

13. The process defined in claim 12 wherein the amount of cocatalyst introduced into the process is about 1500 to about 5000 parts per million parts of polymer in the fluidized bed and the amount of promoter introduced into the process is about 800 to about 1400 parts per million parts of polymer in the fluidized bed.

* * * * *